(12) United States Patent
Sun et al.

(10) Patent No.: US 10,372,140 B2
(45) Date of Patent: Aug. 6, 2019

(54) MOVING ROBOT AND CONTROL METHOD THEREOF

(71) Applicant: LG ELECTRONICS INC., Seoul (KR)

(72) Inventors: Changhwa Sun, Seoul (KR); Kyuchun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 278 days.

(21) Appl. No.: 15/493,365

(22) Filed: Apr. 21, 2017

(65) Prior Publication Data

US 2017/0315560 A1    Nov. 2, 2017

(30) Foreign Application Priority Data

Apr. 29, 2016   (KR) .................. 10-2016-0053258

(51) Int. Cl.
  *G05D 1/02*   (2006.01)
  *A01D 34/00*   (2006.01)

(52) U.S. Cl.
  CPC ......... *G05D 1/0268* (2013.01); *A01D 34/008* (2013.01); *G05D 1/0265* (2013.01); *G05D 1/0272* (2013.01); *G05D 2201/0208* (2013.01); *Y10S 901/01* (2013.01); *Y10S 901/46* (2013.01)

(58) Field of Classification Search
  CPC .. G05D 1/0268; G05D 1/0227; G05D 1/0212; A01D 34/00; A01D 34/008; B62D 6/00
  USPC ....................................................... 700/258
  See application file for complete search history.

(56) References Cited

U.S. PATENT DOCUMENTS

| 6,321,515 | B1 | 11/2001 | Colens |
| 2004/0193339 | A1* | 9/2004 | Hulden ................ G05D 1/0272 701/23 |
| 2006/0064204 | A1* | 3/2006 | Kim ......................... F24F 3/12 700/276 |
| 2010/0332067 | A1 | 12/2010 | Abramson |

(Continued)

FOREIGN PATENT DOCUMENTS

| EP | 2 263 510 | 12/2010 |
| JP | H06 119038 | 4/1994 |

(Continued)

OTHER PUBLICATIONS

Korean Notice of Allowance issued in application 10-2016-0053258 dated Jan. 31, 2018 (full Korean text).

(Continued)

*Primary Examiner* — Kira Nguyen
(74) *Attorney, Agent, or Firm* — KED & Associates LLP (57) ABSTRACT

A moving robot is provided. The moving robot includes a body, first and second driving wheels configured to move the body, first and second caster wheels installed movably, first and second sensors configured to respectively detect a rotation angle of the first caster wheel and a rotation angle of the second caster wheel with respect to a predetermined direction axis, and a controller configured to control driving of a driving wheel according to the rotation angles. The controller calculates an average rotation angle by using the rotation angles detected by the first and second sensors and controls driving of the driving wheel by using the calculated average rotation angle.

20 Claims, 7 Drawing Sheets

(56) References Cited

U.S. PATENT DOCUMENTS

2012/0219207 A1* 8/2012 Shin .................. B25J 9/162
                                                     382/153
2014/0222197 A1   8/2014 Letsky
2017/0354304 A1* 12/2017 Kwak ................. A47L 5/36

FOREIGN PATENT DOCUMENTS

| JP | 3 355506 | 12/2002 |
|----|----------|---------|
| KR | 10-0560966 | 3/2006 |
| KR | 10-2010-0136885 | 12/2010 |
| KR | 10-2013-0143228 | 12/2013 |

OTHER PUBLICATIONS

European Search Report dated Sep. 1, 2017 issued in Application No. 17168969.8.
Korean Office Action dated Sep. 20, 2017 issued in Application No. 10-2016-0053258.

* cited by examiner

MOVING ROBOT AND CONTROL METHOD THEREOF

CROSS-REFERENCE TO RELATED APPLICATION(S)

Pursuant to 35 U.S.C. § 119(a), this application claims the benefit of earlier filing date and right of priority to Korean Application No. 10-2016-0053258, filed on Apr. 29, 2016, the contents of which is incorporated by reference herein in its entirety.

BACKGROUND

1. Field

The present disclosure relates to a moving robot and a control method thereof, and particularly, to a moving robot and a control method thereof, which mows lawn.

2. Background

Lawn mowers are devices for trimming lawn which are planted on yards of homes, playgrounds, and/or the like. The lawn mowers are categorized into lawn mowers for homes used in homes and lawn mowers for tractors used in wide playgrounds or wide farms.

The lawn mowers for homes are divided into a walk behind type, where a user mows lawn while dragging a lawn mower behind, and a hand type where a user directly carries a lawn mower by hand.

However, in two types of lawn mowers, there is a difficulty in that a user should directly operate a lawn mower.

Particularly, since it is difficult for a user to directly operate a lawn mower to mow lawn on a playground in busy daily life, a laborer for mowing lawn is mainly used, and for this reason, the employment cost is expended.

Therefore, a self-driving lawn mower for preventing the additional cost and reducing inconvenience of a user is being developed. Various researches for controlling the moving performance of a lawn mowing robot.

In comparison with a working area of a moving robot, a working area of the lawn mowing robot has a different feature. In the working area, the work efficiency of the lawn mowing robot including a driving algorithm of a general moving robot is considerably reduced.

In detail, in a case where a lawn mowing robot is driving in a critical region such as an inclined plane, the lawn mowing robot can be slipped down through the inclined plane without driving in a desired direction. When the lawn mowing robot is slipped in the middle of driving, it is difficult to detect a position of the lawn mowing robot or move the robot through a predetermined route.

Furthermore, in determining whether a lawn mowing robot is slipped in the middle of driving on an inclined plane, in a case of using only a sensor which senses tilting of a robot body or information associated with a posture, it is difficult to accurately determine whether the lawn mowing robot goes straight or diagonally on the inclined plane.

In a case where a lawn mowing robot self-drives in a working area, the lawn mowing robot needs an algorithm enabling the lawn mowing robot to move along a driving route even under various inclined plane conditions in the working area.

BRIEF DESCRIPTION OF THE DRAWINGS

The embodiments will be described in detail with reference to the following drawings in which like reference numerals refer to like elements wherein.

The accompanying drawings, which are included to provide a further understanding of the disclosure and are incorporated in and constitute a part of this specification, illustrate exemplary embodiments and together with the description serve to explain the principles of the disclosure.

DETAILED DESCRIPTION

Hereinafter, an embodiment where a moving robot 100 according to the present invention drives in an operating area 1000 will be described with reference to FIG. 1.

For reference, the below-described moving robot 100 may perform self-driving in the operating area 1000 where lawn is planted, and may mow lawn existing in the operating area 1000 in the middle of performing the self-driving. Therefore, the moving robot 100 described herein may substantially be a lawn mowing robot.

However, the moving robot 100 according to the present invention is not limited to the purpose of mowing lawn, and the moving robot 100 according to the present invention may be various kinds of robots which drive at an outdoor place.

Figure 1:
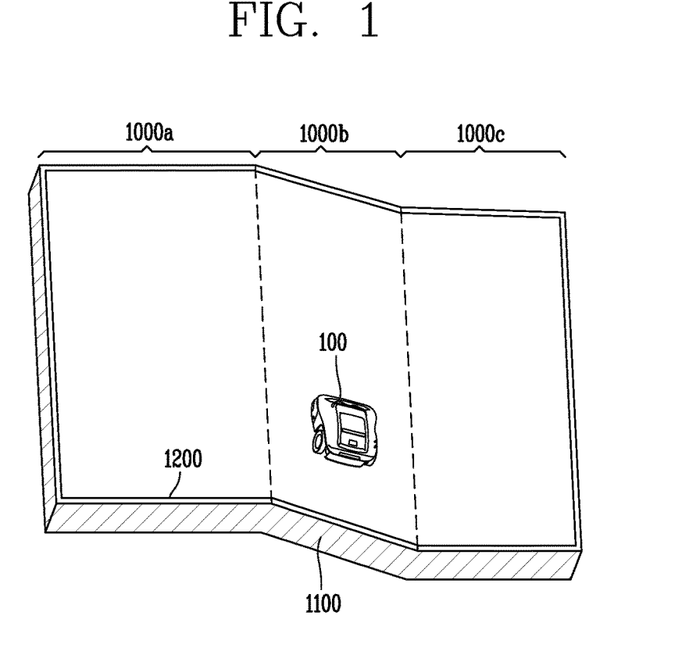
FIG. 1 is a conceptual diagram illustrating an embodiment where a moving robot or a lawn mowing robot for mowing lawn according to an embodiment of the present invention drives in a driving environment including an inclined plane.

Referring to FIG. 1, the operating area 1000 where the moving robot 100 drives may include first to third operating areas 1000a to 1000c. In detail, the second operating area 1000b may include an inclined plane. The second operating area 1000b including the inclined plane may include a ground where lawn is planted. Also, the second operating area 1000b may be provided in a rough shape.

Referring to FIG. 1, the moving robot 100 may autonomously drive in a certain area. Also, the moving robot 100 may perform a specific function in the middle of driving.

In more detail, the moving robot 100 may be a lawn mowing robot. In this case, the specific function may be a function of mowing lawn in the operating area 1000.

Moreover, the operating area 1000 may be defined by a boundary wire 1200 provided a closed curve. In detail, the boundary wire 1200 may be installed in an arbitrary area, and the moving robot 100 may move in an area defined by the closed curve formed by the boundary wire 1200.

The boundary wire 1200 may be installed in the operating area. In more detail, the boundary wire 1200 may be installed on a boundary line between the operating area 1000 of the moving robot 100 and an external area 1100, or may be installed in the operating area 1000 to be spaced apart from by a certain interval.

In this case, a value of the certain interval where the boundary wire 1200 is installed may be changed. Therefore, a user may install the boundary wire 1200 along an outer portion of the operating area 1000, and since it is not required to consider an interval at which the boundary wire 1200 is installed from the outer portion or the external area 1100, the boundary wire 1200 can be more easily installed.

As illustrated in FIG. 1, a charging device 10 of the moving robot 100 may be installed to be connected to the boundary wire 1200. Although not shown, the charging device 10 may be installed in a partial region of the operating area 1000 including an area where the boundary wire 1200 is installed. Also, although not shown in FIG. 1, the charging device 10 may be installed in a partial region of the operating area 1000 and a partial region of the external area 1100.

The operating area 1000 which is an area where the moving robot 100 drives may be provided as a critical region unlike an indoor environment. That is, lawn may be planted in the operating area 1000, and moreover, the operating area 1000 may include various inclined planes, and a floor of the operating area 1000 may be formed of various materials.

Although not shown in FIG. 1, the operating area 1000 may be divided or defined by a boundary generation device (not shown). The boundary generation device may be installed at one point of the operating area 1000, may generate information associated with a boundary of the operating area 1000, and may transmit the generated information associated with the operating area 1000 to the moving robot 100.

Moreover, the boundary generation device may receive the information associated with the boundary of the operating area 1000 from the moving robot 100 and may change the information associated with the boundary of the operating area 1000, based on the information received from the moving robot 100.

For example, the moving robot 100 and the boundary generation device may transmit or receive the information associated with the boundary of the operating area 1000 by using at least one wireless communication of Wi-Fi, Wibro, Bluetooth, Zigbee, and ANT.

Hereinafter, an embodiment of the moving robot 100 according to the present invention will be described with reference to FIG. 2.

Figure 2:
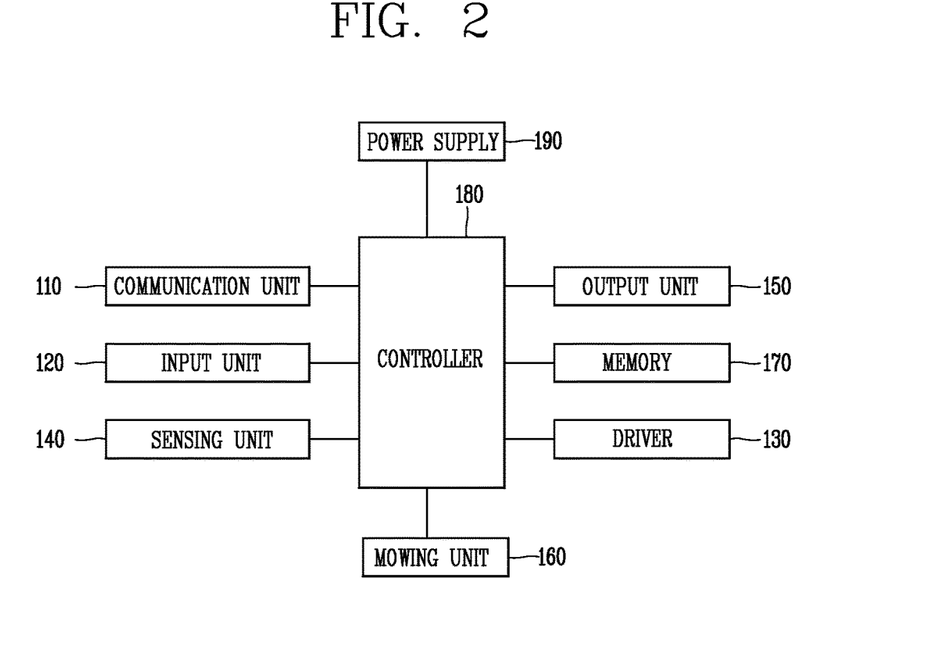
FIG. 2 is a block diagram illustrating elements of a moving robot or a lawn mowing robot for mowing lawn according to an embodiment of the present invention.

As illustrated in FIG. 2, the moving robot 100 may include at least one of a communication unit 110, an input unit 120, a driver 130, a sensing unit 140, an output unit 150, a mowing unit 160, a memory 170, a controller 180, and a power supply 190. The elements illustrated in FIG. 2 are not essential in implementing the moving robot, and thus, the moving robot described herein may have more or fewer elements than the above-listed elements.

In more detail, the communication unit 110 among the elements may include one or more modules which enable wireless communication between the moving robot 100 and a wireless communication system, between the moving robot 100 and another moving robot, between the moving robot 100 and a mobile terminal (not shown), between the moving robot 100 and a communication unit (not shown) of the charging device 10, or between the moving robot 100 and an external server. Also, the communication unit 110 may include one or more modules connecting the moving robot 100 to one or more networks.

The communication unit 110 may include at least one of a mobile communication module, a wireless Internet module, a near field communication (NFC) module, and a position information module.

The input unit 120 may include a camera or an image input unit for inputting an image signal, a microphone or an audio input unit for inputting an audio signal, and a user input unit (for example, a touch key, a mechanical key, etc.) for receiving information from a user. Voice data or image data collected by the input unit 120 may be analyzed and may be processed as a control command of the user.

The sensing unit 140 may include one or more sensors for sensing at least one of internal information of a mobile terminal, ambient environment information surrounding the mobile terminal, and user information. For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared sensor, a finger scan sensor, an ultrasonic sensor, an optical sensor (for example, a camera), a microphone, a battery gauge, an environment sensor (for example, a barometer, a hygrometer, a thermometer, a radiation sensor, a heat sensor, a gas sensor, etc.), and a chemical sensor (for example, an electronic nose, a healthcare sensor, a bio recognition sensor, etc.).

The sensing unit 140 may include at least two coils which are differently installed, and the two coils may each sense a voltage value in the same area divided with respect to the wire 1200. That is, the two coils may sense a voltage value inside a closed loop by the wire 1200.

Moreover, the sensing unit 140 may include a wheel sensor, and the wheel sensor may sense information about at least one operation history of a main driving wheel and an auxiliary driving wheel included in the driver 130.

The moving robot disclosed herein may combine and use pieces of information sensed by at least two or more of the sensors.

Various sensors included in the sensing unit 140 may perform sensor calibration before the moving robot 100 operates. The calibration denotes setting a parameter associated with an operation of a sensor in order for the sensor to operate in an optimal state. In more detail, the calibration denotes correcting a display value of a sensor in comparison with a standard sensor. A user may periodically perform the calibration, thereby controlling the parameter values.

The output unit 150 is for generating an output associated with sight, hearing, tactus and may include at least one of a display unit, a sound output unit, a vibration module, and a light output unit. The display unit may form a mutual layer structure with a touch sensor or may be provided as one body with the touch sensor, thereby implementing a touch screen. The touch screen functions as a user input unit that provides an input interface between the moving robot 100 and a user and may provide an output interface between the moving robot 100 and the user.

The mowing unit 160 is for mowing lawn, and a rotatable knife blade may be provided in the mowing unit 160. That is, the mowing unit 160 may include a knife blade member 161 for mowing lawn, a rotation shaft for rotating the knife blade member, and a motor member.

Moreover, the memory 170 may store data that supports various functions of the moving robot 100. The memory 170 may store a plurality of application programs or applications executed in the moving robot 100, pieces of data for operating the moving robot 100, and commands. At least some of the application programs may be downloaded from an external server through wireless communication. Also, at least some of the application programs may be provided in the moving robot 100 from a release time, for fundamental functions (for example, a mowing function, a moving function, a charging/discharging function, a communication function, etc.) of the moving robot 100. The application programs may be stored in the memory 170, installed in the moving robot 100, and executed by the controller 180 to perform an operation (or a function) of the moving robot.

The controller 180 may control an overall operation of the moving robot 100, in addition to an operation associated with the application programs. The controller 180 may process input or output signals, data, and information by using the elements, thereby providing or processing information or functions appropriate for the user.

Moreover, the controller 180 may control at least some of the elements described above with reference to FIG. 2, for executing the application programs stored in the memory 170. Furthermore, the controller 180 may combine and operate at least two or more of the elements included in the moving robot 100, for executing the application programs.

The power supply 190 may receive external power and internal power and may supply power to the elements included in the moving robot 100 according to control by the controller 180. The power supply 190 may include a battery, and the battery may be an embedded battery or a replaceable battery.

At least some of the elements may operate through cooperation for implementing an operation, control, or a control method of a mobile terminal according to various embodiments described below. Also, the operation, control, or control method of the mobile terminal may be implemented in the mobile terminal through executing of at least one application program stored in the memory 170.

Hereinafter, an embodiment illustrating a rear surface of a moving robot or a lawn mowing robot for mowing lawn will be described with reference to FIG. 3.

Figure 3:
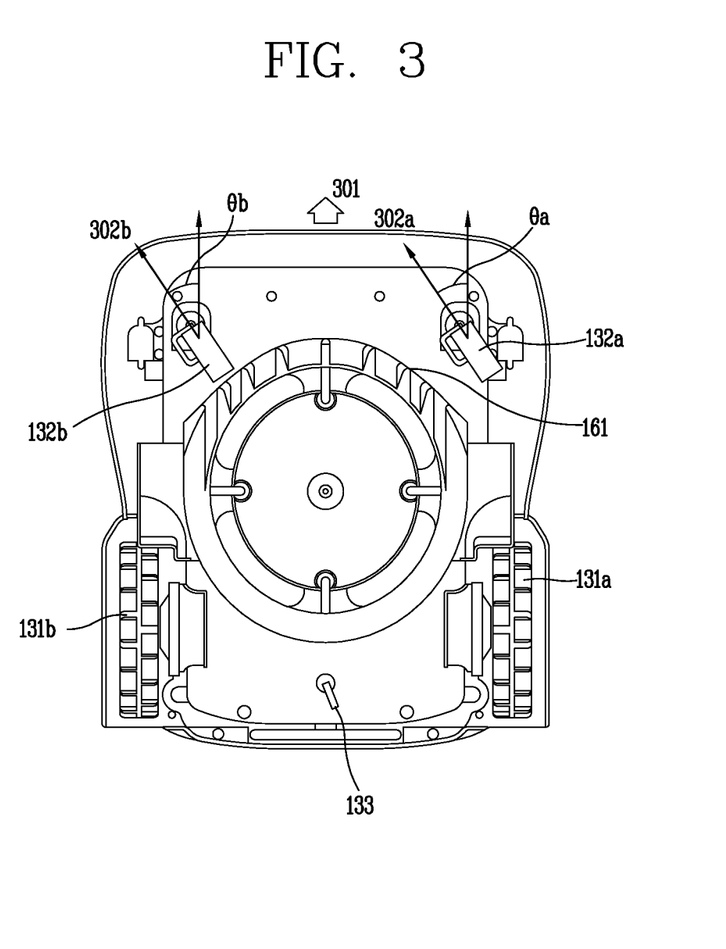
FIG. 3 is a conceptual diagram illustrating a rear surface of a moving robot or a lawn mowing robot for mowing lawn according to an embodiment of the present invention.

As illustrated in FIG. 3, the moving robot 100 may include a first driving wheel 131a and a second driving wheel 131b which are installed on side surfaces of a body of the moving robot 100 to move the moving robot 100. The controller 180 may control a rotation direction and a rotation speed of each of the first and second driving wheels 131a and 131b, for controlling a direction in which the body of the moving robot 100 moves.

Referring to FIG. 3, a first caster wheel 132a and a second caster wheel 132b respectively corresponding to the first driving wheel 131a and the second driving wheel 131b may be provided on the rear surface of the moving robot 100.

In detail, the first caster wheel 132a and the second caster wheel 132b may be disposed more forward than the first driving wheel 131a and the second driving wheel 131b. Therefore, the first caster wheel 132a and the second caster wheel 132b may manually rotate with a driving force generated by the first driving wheel 131a and the second driving wheel 131b. That is, the first caster wheel 132a and the second caster wheel 132b may not autonomously generate the driving force, and may each be a wheel which is provided as a type such as a roller and rotates with an external force.

Such a caster wheel may support the moving robot 100, and a shaft connecting the caster wheel and the body may rotate according to a direction in which the moving robot 100 moves. That is, in a shaft of each of the first caster wheel 132a and the second caster wheel 132b, a rotating angle may vary based on a state of a floor or a ground on which the moving robot 100 drives. Therefore, the first caster wheel 132a and the second caster wheel 132b may be tilted to the left or the right according to a driving state of the moving robot 100.

Referring to FIG. 3, in a case where a moving direction of the moving robot 100 set in the controller 180 corresponds to a front direction 301 of the body, the shaft of each of the first caster wheel 132a and the second caster wheel 132b of the moving robot 100 may rotate by the set moving direction and first and second rotation angles θa and θb.

That is, as illustrated in FIG. 3, the shaft of the first caster wheel 132a may rotate by the first rotation angle θa with respect to the front direction 301 of the body, and the shaft of the second caster wheel 132b may rotate by the second rotation angle θb with respect to the front direction 301 of the body.

Therefore, a direction 302a in which the first caster wheel 132a is aligned and the set moving direction 301 may form the first rotation angle θa, and a direction 302b in which the second caster wheel 132b is aligned and the set moving direction 301 may form the first rotation angle θb.

For example, when slip occurs in the operating area 1000 while the moving robot 100 is driving, the moving direction 301 set in the controller 180 and a direction in which the body of the moving robot 100 moves may be changed. In this case, the controller 180 may detect a direction in which the body of the moving robot 100 actually moves, based on first and second rotation angles by which the shafts of the first caster wheel 132a and the second caster wheel 132b have rotated.

In order to detect the first and second rotation angles, a sensor for sensing a rotation amount of the shaft may be included in the shaft of the caster wheel. In detail, the first caster wheel may include a first sensor for sensing a rotation amount of the first caster wheel, and the second caster wheel may include a second sensor for sensing a rotation amount of the second caster wheel.

For example, the first and second sensors included in the respective shafts may each be an encoder. The encoder included in the shaft may transmit or receive a sensing result to or from the controller 180.

Moreover, referring to FIG. 3, a third caster wheel 133 may be installed behind the body. A diameter of the third caster wheel 133 may be set less than that of each of the first and second caster wheels. An outer circumference surface of the third caster wheel 133 may be set less than that of each of the first and second caster wheels. A material of the third caste wheel 133 may differ from those of the first and second caster wheels.

Although not shown in FIG. 3, the first driving wheel 131a and the first caster wheel 132a may be connected to the same shaft. For example, the first driving wheel 131a and the first caster wheel 132a may be connected to the same shock absorber. Likewise, the second driving wheel 131b and the second caster wheel 132b may be connected to the same shaft or shock absorber.

Referring to FIG. 3, the knife blade member 161 included in the mowing unit 160 may be provided in a center portion of the body.

Hereinafter, a method of driving, by the moving robot or the lawn mowing robot for mowing lawn, on an inclined plane will be described with reference to FIGS. 4A to 4D.

Figure 4A:
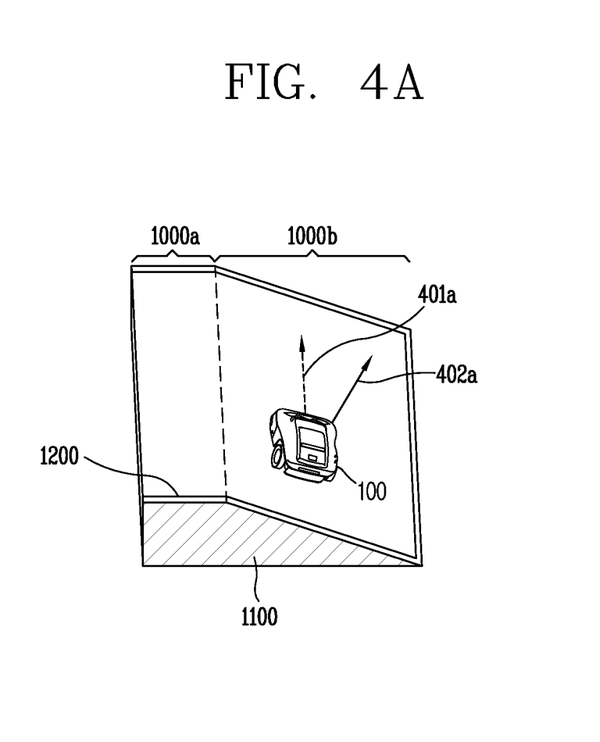
FIGS. 4A to 4D are conceptual diagrams illustrating a method of driving, by a moving robot or a lawn mowing robot for mowing lawn according to an embodiment of the present invention, on an inclined plane.

Referring to FIG. 4A, the moving robot 100 is driving in the second operating area 1000b including an inclined plane, and when slip occurs downward from the inclined plane between the moving robot 100 and the second operating area 1000b, the moving robot 100 cannot move a predetermined driving direction 401a, and may move in a changed driving direction 402a.

In this manner, when the moving robot 100 moves in the changed driving direction 402a, the controller 180 may detect information associated with the changed driving direction 402a by using a rotation angle of each of the shafts of the first and second caster wheels.

For example, in the moving robot 100 which is driving in the second operating area 1000b including the inclined plane, before slip occurs, a direction of a rotation shaft existing in a center of each of the first and second caster wheels may correspond to a direction of a rotation shaft existing in a center of each of the first and second driving wheels.

In another embodiment, in the moving robot 100 which is driving in the second operating area 1000b including the inclined plane, when slip occurs, the first and second caster wheels may form the first and second rotation angles with respect to the predetermined driving direction 401a. That is, in the moving robot 100 which is driving in the second operating area 1000b including the inclined plane, when slip occurs, the first and second caster wheels may be tilted to the left or the right with respect to the predetermined driving direction 401a.

In detail, the controller 180 may calculate an average rotation angle, based on a rotation angle detected by each of the first and second sensors and may control driving of the driving wheel, based on the calculated average rotation angle.

The controller 180 may detect a rotation angle of the shaft of the first caster wheel and a rotation angle of the shaft of the second caster wheel with respect to the predetermined driving direction 401a.

The controller 180 may detect, as an average rotation angle, an average value of the first rotation angle θa, detected by the first sensor included in the first caster wheel, and the second rotation angle θb detected by the second sensor included in the second caster wheel.

The controller 180 may detect the average rotation angle by using the first rotation angle detected by the first sensor, a first weight value corresponding to the first sensor, the second rotation angle detected by the second sensor, and a second weight value corresponding to the second sensor.

Here, the memory 170 of the moving robot 100 may store information associated with the first and second weights, and the controller 180 may apply the stored first and second weigh values to the detected first and second rotation angles to detect the average rotation angle.

For example, the controller 180 may detect, as the average rotation angle, an average value of a first correction rotation angle obtained by multiplying the first rotation angle and the first weight value and a second correction rotation angle obtained by multiplying the second rotation angle and the second weight value.

The controller 180 may compare a size of the first rotation angle and a size of the second rotation angle and may vary or again set the first and second weight values, based on a result of the comparison.

In detail, when the first rotation angle is greater than the second rotation angle, the controller 180 may increase the first weight value, calculate the first and second correction rotation angles, and detect the average rotation angle. Also, when the second rotation angle is greater than the first rotation angle, the controller 180 may increase the second weight value and then may detect the average rotation angle.

When a difference between the size of the first rotation angle and the size of the second rotation angle increases as the comparison result of the first and second rotation angles, the controller 180 may increase a degree to which the first and second weight values increase. That is, when the first rotation angle is greater than the second rotation angle, as a difference between the first rotation angle and the second rotation angle increases, the controller 180 may further increase the first weight value.

Moreover, the controller 180 may compare a variation rate of the first rotation angle and a variation rate of the second rotation angle and may vary or again set the first and second weight values, based on a result of the comparison.

In detail, when the variation rate of the first rotation angle is greater than the variation rate of the second rotation angle, the controller 180 may increase the first weight value and detect the average rotation angle. Also, when the variation rate of the second rotation angle is greater than the variation rate of the first rotation angle, the controller 180 may increase the second weight value and then may detect the average rotation angle.

When a difference between the variation rate of the first rotation angle and the variation rate of the second rotation angle increases, the controller 180 may increase a degree to which the first and second weight values increase.

The sensing unit 140 of the moving robot 100 may include a gyro sensor 152, and the gyro sensor 142 may detect information associated with a posture of the body of the moving robot 100. That is, when the body of the moving robot 100 is located on an inclined plane, the gyro sensor 142 may detect an inclined direction or an inclined angle which the body is inclined in or at due to the inclined plane.

Furthermore, the controller 180 may vary or again set at least one of the first and second weight values, based on the inclined direction of the moving robot 100 detected by the gyro sensor 142.

For example, when the moving robot 100 is inclined in a direction in which the first caster wheel is installed, the controller 180 may increase the first weight value corresponding to the first sensor of the first caste wheel.

In another embodiment, as the inclined angle of the moving robot 100 increases, the controller 180 may increase a degree to which a weight value corresponding to a caster wheel provided on a side to which the moving robot 100 is inclined increases.

Figure 4B:
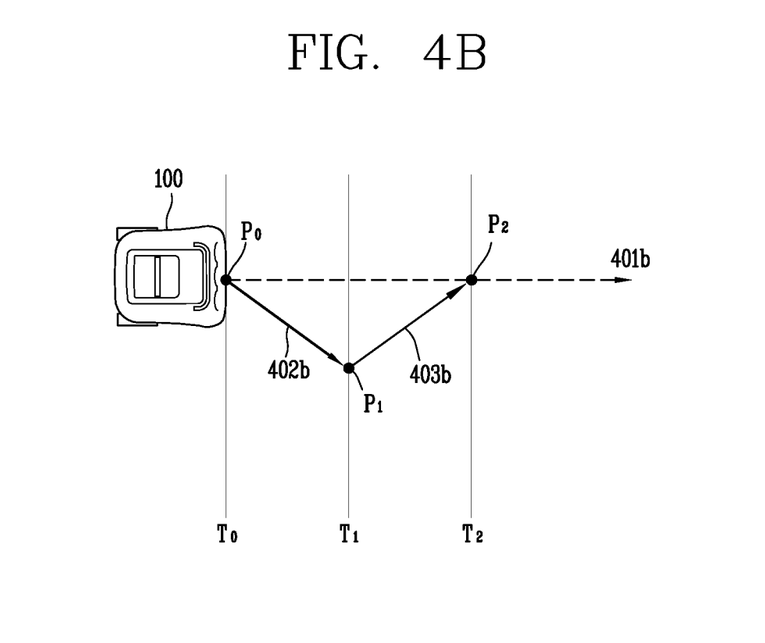

Referring to FIG. 4B, when the moving robot 100 is driving on an inclined plane, the controller 180 may control the driving wheel to move the body along a first driving route 401b. The first driving route 401b may be a predetermined driving route. Also, the first driving route 401b may be a portion of a zigzag driving route.

When the moving robot 100 deviates from the first driving route 401b and moves along a second driving route 402b, the controller 180 may detect information associated with a direction in which the moving robot 100 moves, based on a rotation angle of each of first and second caster wheel shafts.

The controller 180 may detect an average rotation angle associated with the first and second caster wheels by using the first rotation angle which is the rotation angle of the first caster wheel shaft and the second rotation angle which is the rotation angle of the second caster wheel shaft, and may detect information associated with a moving direction of the moving robot 100, based on the detected average rotation angle. The controller 180 may compare a current position of the body, a detected traveling direction, and information associated with the predetermined first driving route to determine whether the body deviates from the predetermined first driving route.

As illustrated in FIG. 4B, when slip occurs at a first position P1, the moving robot 100 may deviate from the predetermined first driving route 401b and may move along the second driving route 402b.

When the moving robot 100 reaches a second position P2, the controller 180 may detect information associated with the moving direction of the moving robot 100 by using the rotation angle of each of the first and second caster wheel shafts. Therefore, when the moving robot 100 reaches the second position P2, the controller 180 may detect that the moving robot 100 deviates from the first driving route 401b. Furthermore, when it is determined that the moving robot 100 deviates from the first driving route 401b, the controller 180 may control the driving wheel in order for the moving robot 100 to return to the first driving route 401b which is an original driving route.

Referring to FIG. 4B, the controller 180 may control the first and second driving wheels in order for the moving robot 100 to return from the position P2, at which is located out of the first driving route 401b, to an arbitrary third position P3 which is located on the first driving route 401b.

As illustrated in FIG. 4B, the controller 180 may control the driving wheel so that a traveling direction of the body is changed by a detected average rotation angle to a direction opposite to a direction in which the first and second caster wheel shafts rotate with respect to a predetermined direction axis. For example, the predetermined direction axis may correspond to a traveling direction of the moving robot 100 based on the first driving route 401 immediately before slip occurs.

Therefore, when the moving robot 100 reaches the third position P3 on the first driving route 401b, the controller 180 may control the driving wheel in order for a traveling direction of the body to correspond to the first driving route 401b.

Hereinafter, a driving method of coping with slip when the moving robot 100 is moving on an inclined plane along a zigzag driving route 401c will be described with reference to FIG. 4C.

Figure 4C:
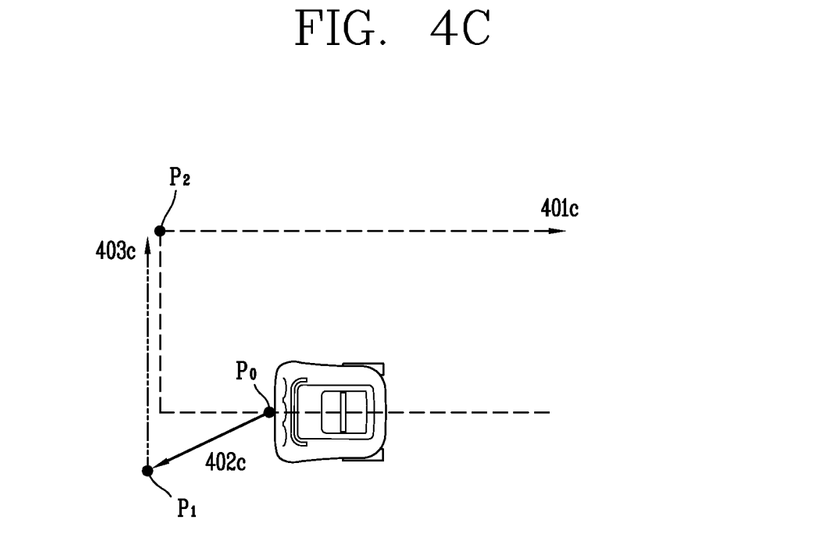

As illustrated in FIG. 4C, when slip occurs at a first position P1 while the moving robot 100 is moving on an inclined plane along the zigzag driving route 401c in an operating area which is the inclined plane, the moving robot 100 may move along a changed driving route 402c.

The controller 180 may determine whether slip occurs, based on a rotation angle of each of the first and second caster wheel shafts in the middle of driving along the zigzag driving route 401c.

When it is determined that slip occurs while the moving robot 100 is driving along the zigzag driving route 401c, the controller 180 may control the driving wheel to move the body along a straight driving route 403c which connects a second position P2, located on the changed driving route 402c, to a third position P3 located on the zigzag driving route 401c.

Figure 4D:
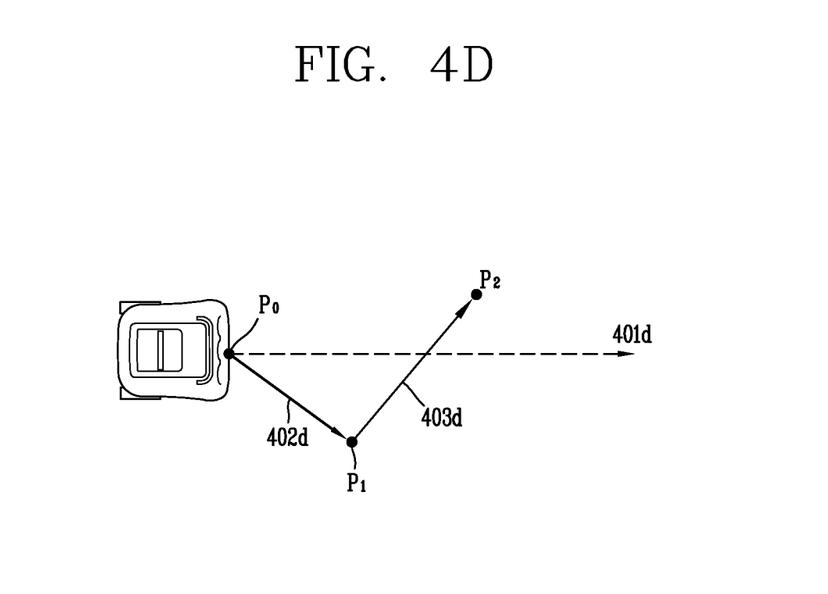

As illustrated in FIG. 4D, the controller 180 may control the driving wheel so that a traveling direction of the body is changed by an angle greater than the calculated average rotation angle to a direction opposite to a direction in which the first and second caster wheel shafts rotate with respect to the predetermined direction axis.

For example, the controller 180 may control the driving wheel so that a traveling direction of the body is changed by twice the calculated average rotation angle to a direction opposite to a direction in which the first and second caster wheel shafts rotate with respect to the predetermined direction axis.

Figure 5:
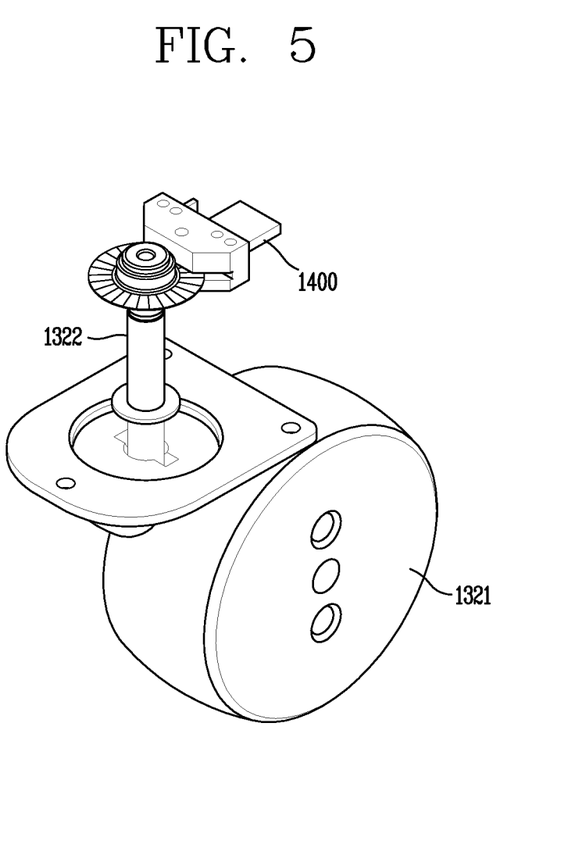
FIG. 5 is a conceptual diagram illustrating elements of a caster wheel of a moving robot or a lawn mowing robot for mowing lawn according to an embodiment of the present invention.

Hereinafter, elements of a caster wheel of a moving robot or a lawn mowing robot for mowing lawn according to an embodiment of the present invention will be described with reference to FIG. 5.

A caster wheel installed on a rear surface of a moving robot 100 may include a roller 1321 which is installed to be movable by an external force. Also, the caster wheel may include a caster wheel shaft 1322 that connects a rear surface of a body to a body of the caster wheel.

Moreover, the caster wheel may include an angle detection sensor 1400 that senses a rotation angle with respect to a predetermined direction axis of the caster wheel shaft 1322. The angle detection sensor 1400 may be an encoder.

Hereinafter, a control method of a moving robot or a lawn mowing robot for mowing lawn according to an embodiment of the present invention will be described with reference to FIGS. 6A to 6C.

Figure 6A:
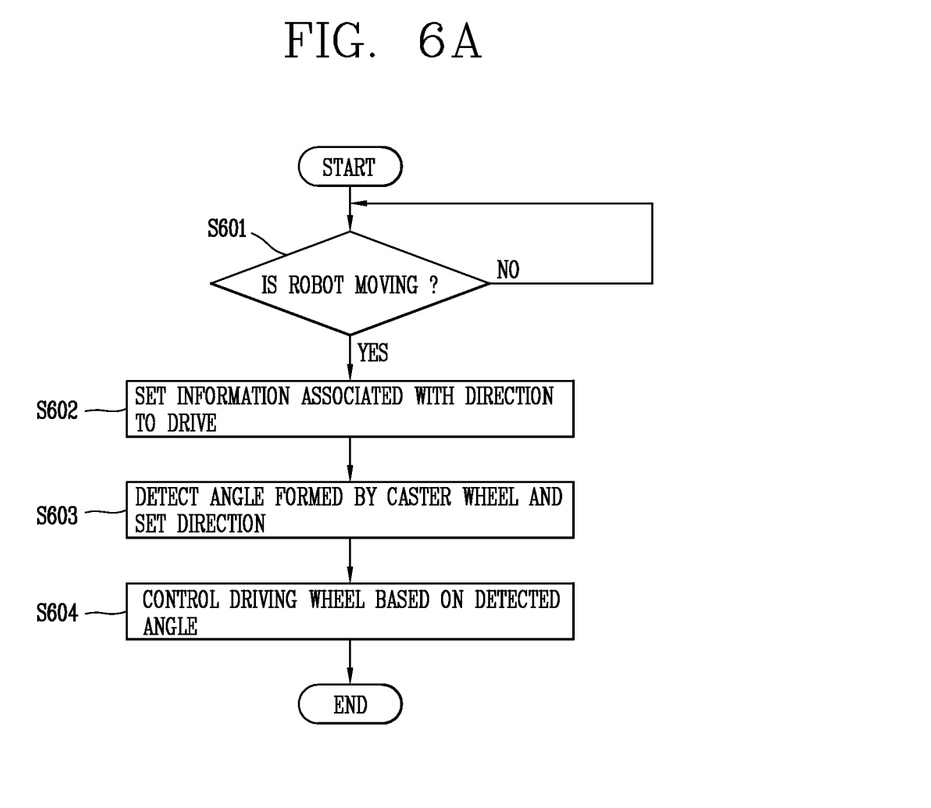
FIGS. 6A to 6C are flowcharts a control method of a moving robot or a lawn mowing robot for mowing lawn according to an embodiment of the present invention.

Referring to FIG. 6A, in operation S601, the controller 180 may determine whether the moving robot 100 is moving.

When the moving robot 100 is moving, the controller 180 may set information associated with a direction to drive in operation S602. That is, the controller 180 may set information associated with a predetermined driving route.

In operation S603, the controller 180 may detect an angle which is formed by the set direction and the caster wheel.

In detail, the controller 180 may detect an angle which is formed by a direction corresponding to the predetermined driving route and an outer circumference surface of each of the first and second caster wheels.

In operation S604, the controller 180 may control the driving wheel by using information associated with the detected angle.

Figure 6B:
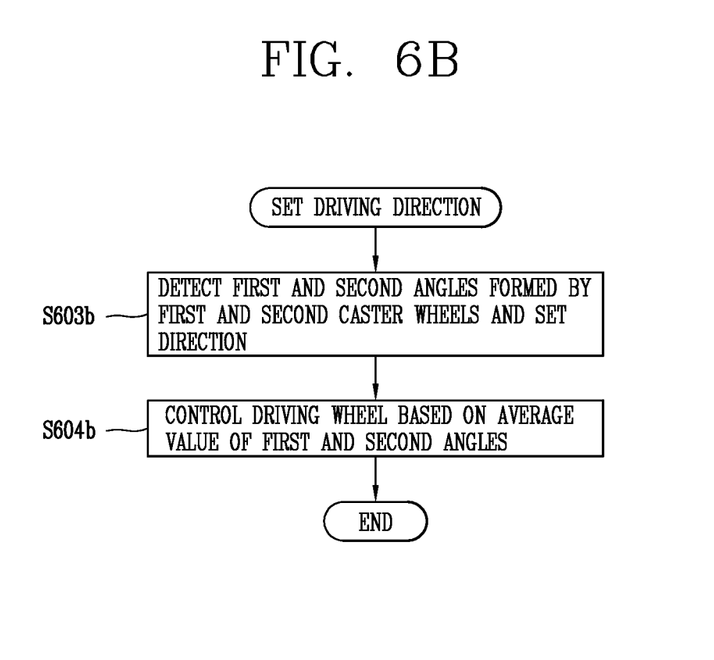

Referring to FIG. 6B, in operation S603b, the controller 180 may detect a first angle and a second angle which are formed the first and second caster wheels and a predetermined driving direction of the moving robot 100.

Furthermore, in operation S604b, the controller 180 may control the driving wheel, based on an average value of the first and second angles.

Figure 6C:
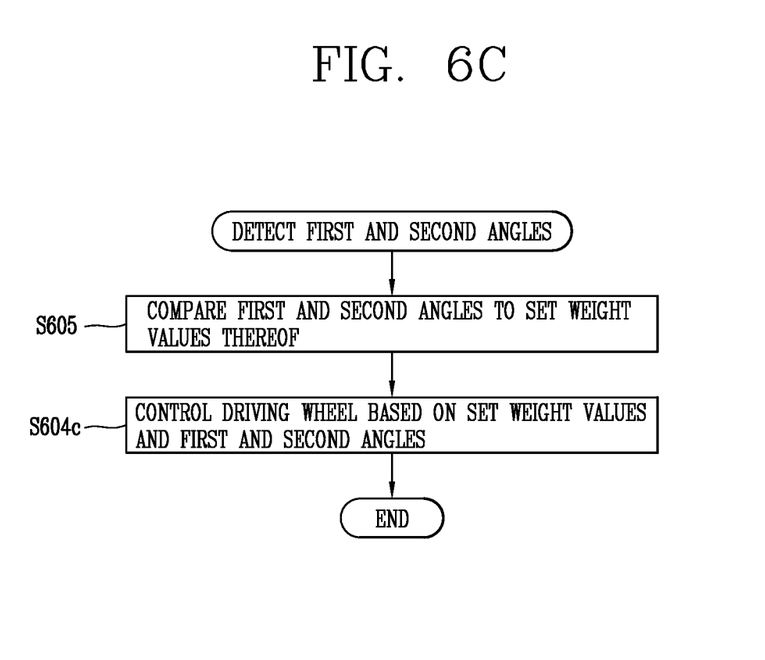

Moreover, referring to FIG. 6C, the controller 180 may compare the first angle and the second angle to set a weight value of each of the first angle and the second angle in operation S605.

Moreover, in operation S604c, the controller 180 may control the driving wheel, based on the set weight value and the first and second angles.

The moving robot according to the present invention may detect whether slip occurs in an inclined plane, and thus, by controlling driving of the moving robot on the inclined plane, a driving route of the moving robot which is driving in a critical region such as an inclined plane may be corrected.

Moreover, the moving robot according to the present invention can more accurately determine whether slip occurs in an inclined plane, based on an angle which is formed by one shaft of each of plurality of caster wheels and one shaft of a driving wheel.

Moreover, by using an encoder installed in a caster wheel and a sensor detecting a posture of a body, the moving robot according to the present invention may determine whether the moving robot is normally driving on an inclined plane.

Furthermore, even when the moving robot according to the present invention deviates from a driving route on an inclined plane, the moving robot may again return to the driving route, thereby enhancing the driving performance of the moving robot.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

Therefore, an aspect of the detailed description is to provide a moving robot and a control method thereof, which prevent the moving robot from moving in a diagonal direction when slip occurs in a driving wheel of the moving robot executing a straight driving algorithm along an arbitrary driving route.

Moreover, another aspect of the detailed description is to provide a moving robot which does not deviate from a predetermined driving route on an inclined plane and a control method thereof, or provide a moving robot which returns to a driving route when the moving robot deviates from the driving route and a control method thereof.

Moreover, another aspect of the detailed description is to provide a method of determining whether slip occurs between an inclined plane and a driving wheel of a moving robot which is driving on the inclined plane.

Moreover, another aspect of the detailed description is to provide a moving robot and a control method thereof, which perform driving route compensation when slip occurs between an inclined plane and a driving wheel of a moving robot which is driving on the inclined plane.

To achieve these and other advantages and in accordance with the purpose of this specification, as embodied and broadly described herein, a lawn mowing robot for performing self-driving includes a body, first and second driving wheels configured to move the body, first and second caster wheels installed movably, first and second sensors configured to respectively detect a rotation angle of the first caster wheel and a rotation angle of the second caster wheel with respect to a predetermined direction axis, and a controller configured to control driving of a driving wheel according to the rotation angles. The controller may calculate an average rotation angle by using the rotation angles detected by the first and second sensors and controls driving of the driving wheel by using the calculated average rotation angle.

According to an embodiment of the present invention, the controller may detect, as the average rotation angle, an average value of a first rotation angle detected by the first sensor and a second rotation angle detected by the second sensor.

According to an embodiment of the present invention, the controller may detect the average rotation angle by using a first rotation angle detected by the first sensor, a first weight value corresponding to the first sensor, a second rotation angle detected by the second sensor, and a second weight value corresponding to the second sensor.

According to an embodiment of the present invention, the controller may detect, as the average rotation angle, an average value of a first correction rotation angle obtained by multiplying the first rotation angle and the first weight value and a second correction rotation angle obtained by multiplying the second rotation angle and the second weight value.

According to an embodiment of the present invention, the controller may compare a size of the first rotation angle and a size of the second rotation angle and varies the first and second weight values, based on a result of the comparison.

According to an embodiment of the present invention, when the first rotation angle is greater than the second rotation angle, the controller may increase the first weight value and detects the average rotation angle, and when the second rotation angle is greater than the first rotation angle, the controller may increase the second weight value and detects the average rotation angle.

According to an embodiment of the present invention, when a difference between the size of the first rotation angle and the size of the second rotation angle increases, the controller may increase a degree to which the first and second weight values increase.

According to an embodiment of the present invention, the controller may compare a variation rate of the first rotation angle and a variation rate of the second rotation angle and may vary the first and second weight values, based on a result of the comparison.

According to an embodiment of the present invention, when the variation rate of the first rotation angle is greater than the variation rate of the second rotation angle, the controller may increase the first weight value and detects the average rotation angle, and when the variation rate of the second rotation angle is greater than the variation rate of the first rotation angle, the controller may increase the second weight value and detects the average rotation angle.

According to an embodiment of the present invention, when a difference between the variation rate of the first rotation angle and the variation rate of the second rotation angle increases, the controller may increase a degree to which the first and second weight values increase.

According to an embodiment of the present invention, the lawn mowing robot may further include a gyro sensor configured to detect information associated with a posture of the body. The controller may detect an inclined direction of the body, based on the information associated with the posture and varies at least one of the first and second weight values, based on the detected direction.

According to an embodiment of the present invention, the controller may control the driving wheel to move the body according to a predetermined route.

According to an embodiment of the present invention, the controller may detect information associated with a traveling direction of the body, based on the average rotation angle, and the controller may compare a current position of the body, the detected traveling direction, and the predetermined route to determine whether the body deviates from the predetermined route.

According to an embodiment of the present invention, when it is determined that the body deviates from the predetermined route, the controller may control the driving wheel to return to the body to the predetermined route.

According to an embodiment of the present invention, the controller may control the driving wheel so that a traveling direction of the body is changed by the calculated average rotation angle to a direction opposite to a direction in which the first and second caster wheels rotate with respect to the predetermined direction axis.

According to an embodiment of the present invention, the controller may control the driving wheel so that a traveling direction of the body is changed by an angle greater than the calculated average rotation angle to a direction opposite to a direction in which the first and second caster wheels rotate with respect to the predetermined direction axis.

According to an embodiment of the present invention, when the body deviates from the predetermined route and again reaches the predetermined route, the controller may control the driving wheel so that a traveling direction of the body corresponds to the predetermined route.

The moving robot according to the present invention may detect whether slip occurs in an inclined plane, and thus, by controlling driving of the moving robot on the inclined plane, a driving route of the moving robot which is driving in a critical region such as an inclined plane may be corrected.

Moreover, the moving robot according to the present invention can more accurately determine whether slip occurs in an inclined plane, based on an angle which is formed by one shaft of each of plurality of caster wheels and one shaft of a driving wheel.

Moreover, by using an encoder installed in a caster wheel and a sensor detecting a posture of a body, the moving robot according to the present invention may determine whether the moving robot is normally driving on an inclined plane.

Furthermore, even when the moving robot according to the present invention deviates from a driving route on an inclined plane, the moving robot may again return to the driving route, thereby enhancing the driving performance of the moving robot.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lawn mowing robot comprising:
   a body;
   first and second driving wheels configured to move the body;
   first and second caster wheels that are movably installed at the body;
   a first sensor configured to detect a rotation angle of the first caster wheel with respect to a predetermined direction axis, and a second sensor configured to detect a rotation angle of the second caster wheel with respect to a predetermined direction axis; and
   a controller configured to control driving of a driving wheel based on the rotation angles of the first and second caster wheels,
   wherein the controller to determine an average rotation angle based on the rotation angles detected by the first and second sensors, and the controller to control driving of the driving wheel based on the determined average rotation angle.

2. The lawn mowing robot of claim 1, wherein the controller to determine the average rotation angle based on an average value of a first rotation angle detected by the first sensor and a second rotation angle detected by the second sensor.

3. The lawn mowing robot of claim 1, wherein the controller to determine the average rotation angle based on a first rotation angle detected by the first sensor, a first weight value corresponding to the first sensor, a second rotation angle detected by the second sensor, and a second weight value corresponding to the second sensor.

4. The lawn mowing robot of claim 3, wherein the controller to determine the average rotation angle based on an average value of a first correction rotation angle obtained by multiplying the first rotation angle and the first weight value and a second correction rotation angle obtained by multiplying the second rotation angle and the second weight value.

5. The lawn mowing robot of claim 3, wherein the controller to compare a size of the first rotation angle and a size of the second rotation angle, and the controller to change the first and second weight values, based on a result of the comparing of the size of the first rotation angle and the size of the second rotation angle.

6. The lawn mowing robot of claim 5, wherein:
   when the first rotation angle is greater than the second rotation angle, the controller to increase the first weight value and to determine the average rotation angle, and
   when the second rotation angle is greater than the first rotation angle, the controller to increase the second weight value and to determine the average rotation angle.

7. The lawn mowing robot of claim 6, wherein in response to an increase in a difference between a size of the first rotation angle and a size of the second rotation angle, the controller to increase a degree to which the first and second weight values increase.

8. The lawn mowing robot of claim 3, wherein the controller to compare a variation rate of the first rotation angle and a variation rate of the second rotation angle, and the controller to change the first and second weight values, based on a result of the comparison of the variation rate of the first rotation angle and the variation rate of the second rotation angle.

9. The lawn mowing robot of claim 7, wherein
   in response to the variation rate of the first rotation angle being greater than the variation rate of the second rotation angle, the controller to increase the first weight value and to determine the average rotation angle, and
   in response to the variation rate of the second rotation angle being greater than the variation rate of the first rotation angle, the controller on increase the second weight value and to determine the average rotation angle.

10. The lawn mowing robot of claim 9, wherein in response to an increase in a difference between the variation rate of the first rotation angle and the variation rate of the second rotation angle, the controller to increase a degree to which the first and second weight values increase.

11. The lawn mowing robot of claim 3, further comprising:
a gyro sensor configured to detect information associated with the body,
wherein the controller to detect an inclined direction of the body, based on the information associated with the body, and the controller to change at least one of the first and second weight values, based on the detected direction.

12. The lawn mowing robot of claim 1, wherein the controller to move the body based on a predetermined route.

13. The lawn mowing robot of claim 12, wherein:
the controller to detect information associated with a traveling direction of the body based on the average rotation angle, and
the controller to compare a current position of the body, the detected traveling direction, and the predetermined route in order to determine whether the body of the lawn mowing robot deviates from the predetermined route.

14. The lawn mowing robot of claim 13, wherein when the body of the lawn mowing robot is determined to deviate from the predetermined route, the controller to return the body to the predetermined route.

15. The lawn mowing robot of claim 14, wherein the controller to control the driving wheel such that a traveling direction of the body is changed by the calculated average rotation angle to a direction opposite to a direction in which the first and second caster wheels rotate with respect to the predetermined direction axis.

16. The lawn mowing robot of claim 14, wherein the controller to control the driving wheel such that a traveling direction of the body is changed by an angle greater than the determined average rotation angle to a direction opposite to a direction in which the first and second caster wheels rotate with respect to the predetermined direction axis.

17. The lawn mowing robot of claim 16, wherein when the body of the lawn mowing robot deviates from the predetermined route and subsequently again reaches the predetermined route, the controller to control the body of the lawn mowing robot such that a traveling direction of the body corresponds to the predetermined route.

18. A robot comprising:
a body;
first and second driving wheels at the body;
first and second caster wheels, at the body, to be movable according to a moving direction of the body;
a first sensor configured to determine a first rotation angle at the first caster wheel and based on a predetermined direction;
a second sensor configured to determine a second rotation angle at the second caster wheel and based on the predetermined direction; and
a controller configured to control driving of the body based on the first and second rotation angles,
wherein the controller to determine an average rotation angle based on the determined first and second rotation angles and to control at least one of a driving wheel and the first and second caster wheels based on the determined average rotation angle.

19. The robot of claim 18, wherein the controller to determine the average rotation angle based on an average value of the first rotation angle determined by the first sensor and the second rotation angle determined by the second sensor.

20. The robot of claim 18, wherein the controller to determine the average rotation angle based on the first rotation angle determined by the first sensor, a first weight value corresponding to the first sensor, the second rotation angle determined by the second sensor, and a second weight value corresponding to the second sensor.

* * * * *